(12) United States Patent
Poussin

(10) Patent No.: US 8,217,831 B2
(45) Date of Patent: Jul. 10, 2012

(54) SYSTEM FOR DETERMINING RELIEF ON A GRANULE FILLING SURFACE IN A PETROCHEMICAL REACTOR

(75) Inventor: Bernard M. Poussin, Carrieres sur Seine (FR)

(73) Assignee: Crealyst, Semur En Vallon (FR)

( * ) Notice: Subject to any disclaimer, the term of this patent is extended or adjusted under 35 U.S.C. 154(b) by 235 days.

(21) Appl. No.: 12/311,913

(22) PCT Filed: Oct. 17, 2007

(86) PCT No.: PCT/FR2007/052185
§ 371 (c)(1),
(2), (4) Date: Jul. 15, 2009

(87) PCT Pub. No.: WO2008/047050
PCT Pub. Date: Apr. 24, 2008

(65) Prior Publication Data
US 2010/0019952 A1      Jan. 28, 2010

(30) Foreign Application Priority Data

Oct. 19, 2006  (FR) ..................................... 06 54377

(51) Int. Cl.
*G01S 13/08* (2006.01)
*G01S 7/02* (2006.01)
*G01F 23/284* (2006.01)
*G01S 13/00* (2006.01)
*G01F 23/00* (2006.01)

(52) U.S. Cl. ........ 342/124; 342/118; 342/175; 73/290 R

(58) Field of Classification Search .................... 342/82, 342/89, 118, 123, 124, 146, 147, 158, 175, 342/195; 73/290 R, 304 R, 304 C, 290 B, 73/290 V, 865.8, 866

See application file for complete search history.

(56) References Cited

U.S. PATENT DOCUMENTS

| 4,219,814 A * | 8/1980 | Johnson ........................ 342/124 |
| 4,234,882 A * | 11/1980 | Thompson ..................... 342/124 |
| 4,332,374 A * | 6/1982 | Kremer ......................... 342/124 |
| 5,043,735 A * | 8/1991 | Mawhinney et al. ......... 342/124 |
| 6,759,977 B1 * | 7/2004 | Edvardsson et al. .......... 342/124 |
| 6,859,166 B2 * | 2/2005 | Edvardsson .................. 342/124 |
| 6,986,294 B2 * | 1/2006 | Fromme et al. ............. 73/865.8 |
| 7,408,501 B2 * | 8/2008 | Rolfes et al. .................. 342/124 |
| 7,552,634 B2 * | 6/2009 | Huber et al. ................ 73/290 V |
| 2004/0031335 A1 | 2/2004 | Fromme et al. |
| 2006/0201245 A1 | 9/2006 | Huber et al. |
| 2006/0201246 A1 | 9/2006 | Rolfes et al. |

FOREIGN PATENT DOCUMENTS

| FR | 2 862 625 A1 | 5/2005 |
| FR | 2 872 497 A1 | 1/2006 |

* cited by examiner

*Primary Examiner* — Bernarr Gregory
(74) *Attorney, Agent, or Firm* — Oliff & Berridge, PLC

(57) ABSTRACT

The invention relates to a system for determining relief on a granule filling surface in a petrochemical reactor, the filling direction in which the reactor is filled defining a vertical direction, the reactor having a central vertical axis, the system including a transmitter configured to be positioned above the filling surface in such a manner as to transmit a signal to various points of said surface. The system includes shift means for shifting the transmitter about the central axis of the reactor through an angle that is great than 60°.

9 Claims, 2 Drawing Sheets

SYSTEM FOR DETERMINING RELIEF ON A GRANULE FILLING SURFACE IN A PETROCHEMICAL REACTOR

FIELD OF THE INVENTION

Description of the Invention

The present invention relates to a system for determining relief on a granule filling surface in a petrochemical reactor.

The term "granules" is used below to mean any type of divided solid particles. The "vertical direction" is defined as the filling direction in which a petrochemical reactor is filled, and the "horizontal plane" of the petrochemical reactor is defined as a plane perpendicular to said filling direction.

The invention applies to the field of the petrochemical industry. It is known that, in the course of being refined, petroleum oil undergoes chemical reactions, in particular in a receptacle known as a "petrochemical reactor". In order to facilitate the reactions, the oil in the reactor flows through a catalyst in the form of granules that are generally porous extruded beads containing metal compounds. It should be noted that the petrochemical reactor generally operates at pressures lying in the range 0 bars to 100 bars, and at temperatures lying in the range 100° C. to 500° C.

It is known that the catalyst must be replaced once it is spent, e.g. after two years. In order to replace it, firstly the reactor is emptied, and then it is filled with fresh catalyst, by means of a granule filler device such as the device described in document FR 2 862 625. That filler device is placed in the filling opening of the reactor, which opening is generally disposed at the top and in the center of the reactor.

It is known that, while the petrochemical reactor is being filled with granules, the filling surface (i.e. the top surface defining the heap of already-poured granules) should be as plane and as horizontal as possible. If, during the granule filling, the filling surface presents relief, e.g. by forming a cone, then the granules can become segregated, i.e. the largest granules on the surface of the cone slide towards the lowest portions of the cone by gravity. Due to this segregation of the granules, the oil that subsequently flows through the petrochemical reactor tends to go via a preferred passage so that one fraction of the catalytic granules reacts to a larger extent than the remainder.

It is known that catalytic granules are particularly expensive, and so endeavors are made to replace them as infrequently as possible.

That is why endeavors are made to have the catalytic granules react uniformly, without giving rise to a preferred passage for the oil. To this end, it is necessary to fill the rector with the granules without forming a cone on the filling surface.

In order to check that the filling surface is plane and horizontal, and in order to correct it when necessary, it is possible for the reactor to be provided with a system for determining relief on the granule filling surface.

A system for determining relief on a granule filling surface in a storage silo is known from the state of the art. That system has a transmitter, such as a laser beam transmitter, positioned above the filling surface, in the central top portion of the silo, for the purpose of transmitting a signal towards different points of said surface, thereby making it possible to determine the heights of the various points. In order to scan the entire filling surface, the transmitter is provided with means for pivoting about its own axis. Such a system thus makes it possible to obtain a topographical survey of the filling surface. It should be noted that that system is used in a storage silo in the agri-food industry, that receptacle not having the same configuration constraints or indeed the same operating conditions as a petrochemical reactor.

The problem lies in the fact that, while the petrochemical reactor is being filled with granules, the central top portion of the reactor is occupied by the filler device. As a result, in order to obtain a satisfactory topographical survey of the entire filling surface, it would be necessary to place a plurality of transmitters in the top portion of the reactor, in such a manner as to mount them eccentrically relative to the center of the reactor, e.g. a plurality of diametrically opposite transmitters.

Although such a solution would make it possible to obtain accurate measurements, it would require a plurality of transmitters, which would be costly. In addition, since those transmitters would be relatively remote from the filling opening of the reactor, it would be complicated to mount them on the reactor.

OBJECT AND SUMMARY OF THE INVENTION

An object of the present invention is to provide a system that makes it possible to obtain an accurate topographical survey of the filling surface in a petrochemical reactor, without using a plurality of transmitters, even when the top portion of the reactor is occupied by a filler device.

To this end, the invention provides a system for determining relief on a granule filling surface in a petrochemical reactor, the filling direction in which the reactor is filled defining a vertical direction, the reactor having a central vertical axis, the system including a transmitter configured to be positioned above the filling surface in such a manner as to transmit a signal to various points of said surface, said system being characterized in that it includes shift means for shifting the transmitter relative to the central axis of the reactor through an angle that is greater than 60 .

It should be noted that the "shift" of the transmitter corresponds to shifting the transmitter as a whole. It thus comprises a movement in translation or a movement in rotation relative to an axis external to the transmitter, and it differs from pivoting of the transmitter about its own axis.

Thus, by using these shift means, it is possible to shift any transmitter over a relatively long distance so that it can take up a plurality of positions about the central axis, e.g. diametrically opposite positions. As an order of magnitude for the distance of shift of the transmitter, it can be mentioned that, if the reactor is cylindrical, the transmitter may be shifted over a distance greater than the value of the radius of the reactor. As a result, a single transmitter is sufficient to obtain a topographical survey of the filling surface, in spite of the presence of a filler device in the central top portion of the reactor. Thus, the invention is particularly advantageous if the determination system is to be mounted in a reactor provided with a filler device in its top central portion.

In addition, more accurate relief determination is obtained. While it is being shifted, the transmitter can take up a large number of different positions. When the filling surface is not plane, the more positions the transmitter can take up, the more it can vary the viewing angles from which the relief is viewed, and thus the better it can determine the exact shape of said relief.

Furthermore, when relief determination is performed while the reactor is being filled, the filler device can constitute an obstacle to viewing of relief, especially when the transmitter is to be positioned higher than the filler device, so as not to be troubled by the falling granules. By being shifted over a long distance, the transmitter can reach the portions of the surface that were hidden by the filler device when the transmitter was in a preceding position.

Finally, the shift means for shifting the transmitter make it possible to mount the determination system on reactors of various sizes, since the shift distance can be adapted to match the size of the reactor. This is particularly advantageous because it makes it possible to use the same determination system on a wide variety of reactors, which is economical because a reactor might be re-filled only once every two or three years.

Preferably, in order to facilitate taking the measurements, the transmitter is shifted in a horizontal plane of the reactor.

A relief determination system can also have one or more of the following characteristics:

The transmitter is a transceiver, and in particular a radar transceiver. The use of radar is particularly advantageous because it is adapted to taking measurements in a reactor that is being filled with granules, i.e. in an environment charged with dust and with fine particles in suspension. In addition, it is advantageous to use a transmitter that also acts as a receiver, so as to reduce the number of components in the reactor.

The system further includes means for pivoting the transmitter about its own axis. By pivoting the transmitter about its own axis, the accuracy of the determination system is further improved. The pivot means preferably have one or more horizontal pivot axes. Thus, not only can the transmitter be shifted over a long distance, but also its inclination relative to the filling surface can be changed.

The shift means make it possible to shift the transmitter through an angle of 360° about the central axis of the reactor, i.e. the transmitter is capable of going full circle about the central axis, so as to achieve a better topographical survey of the filling surface.

The system includes electric drive means for driving the means for shifting and/or the means for pivoting the transmitter. Such means may be automatic or controlled manually from a control station distant from the petrochemical reactor.

The system includes fastener means for fastening it to a filler device for filling the reactor with granules. Thus, it is particularly easy to mount the transmitter on the reactor, since it suffices to mount it on the filler device, without having to access portions inside the reactor that are difficult to access. Preferably, said fastener means are releasable, so that it is possible to mount the determination system on various different filler devices, and thus on various different reactors.

The shift means comprise rectilinear shift means, in particular a guide rail for guiding the transmitter. In a cylindrical reactor, said rectilinear means may, for example, be positioned on two parallel horizontal chords of the reactor.

The shift means comprise means for shifting the transmitter in rotation about the central axis of the reactor, preferably about a device for filling the reactor with granules. This enables the determination system to be shifted in such a manner as to define a circle about the filler device, thereby improving the accuracy of the measurements. These rotary shift means can optionally be in the form of a circular guide rail. Shift in rotation about the filler device is particularly advantageous since it makes it possible to position the transmitter in a horizontal plane at the same height as the filler device, so that the transmitter is not troubled by the falling granules during filling.

The determination system includes a pivot arm having one end connected to the transmitter and having its opposite end serving to be connected to a granule filler device. Said pivot arm constitutes simple means for achieving the pivoting. In addition, said arm constitutes means for fastening the determination system to the filler device for filling the reactor, without it being necessary for an operator to go inside the reactor to fasten the elements therein.

The invention also provides an assembly made up of a filler device in a petrochemical reactor for filling said reactor with granules and of a determination system for determining relief on the granule filling surface in the reactor as described above.

Finally, the invention provides a method of mounting an assembly as defined above, during which firstly the device for filling the reactor with granules is mounted in the reactor, and then the determination system is mounted on said filler device. Thus, it is possible to mount the determination system, which can be voluminous, after the filler device has been mounted on the reactor, even though said filler device is generally voluminous, in particular since it is disposed facing the filling opening of the reactor.

BRIEF DESCRIPTION OF THE DRAWINGS

The invention can be better understood on reading the following description given merely by way of example and with reference to the drawings, in which.

DETAILED DESCRIPTION

Figure 1:
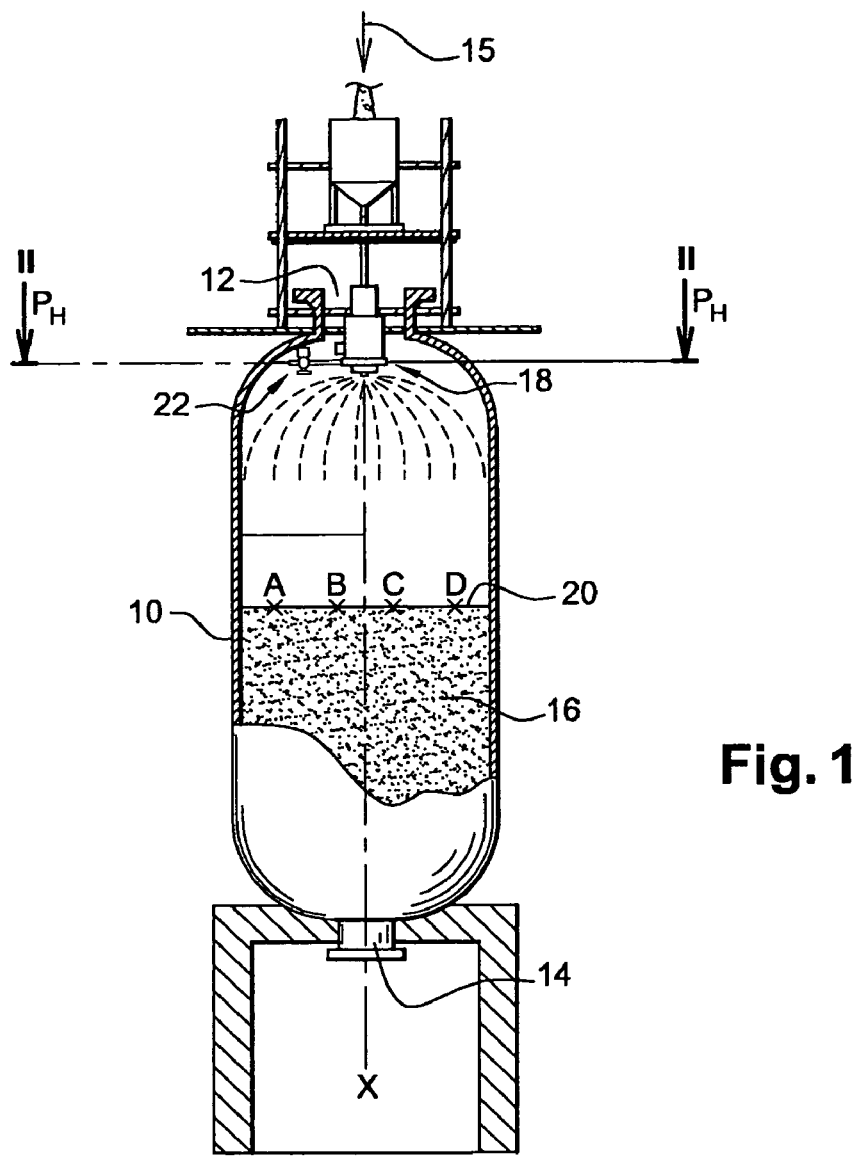
FIG. 1 is a section view of a petrochemical reactor provided with a first embodiment of a relief determination system of the invention.

During a refining process, oil flows through a petrochemical reactor 10 that is cylindrical in general shape and that is shown in FIG. 1. The reactor 10 is provided with a filling opening 12 and with an emptying opening 14. The reactor 10 has a central vertical axis X, and it is filled in a filling direction indicated by the arrow 15.

Before the oil flows through the reactor 10, said reactor is filled with a catalyst 16 in the form of granules, e.g. of porous extruded beads containing metal. The reactor is filled with the granules 16 by means of a filler device 18, similar to the filler device described in Document FR 2 862 625, and it is filled as uniformly as possible by sprinkling the granules in the form of a shower. The filler device 18 is suspended in the reactor by means of vertical support members 19 attached to an external structure.

In order to check that the granule filling surface 20 is plane and horizontal, a system 22 of the invention for determining relief on the surface 20 is mounted on the filler device 18. This system 22 is connected to a processing system and its function is to determine whether the filling surface 20 includes filling discontinuities, such as cones.

Figure 3:
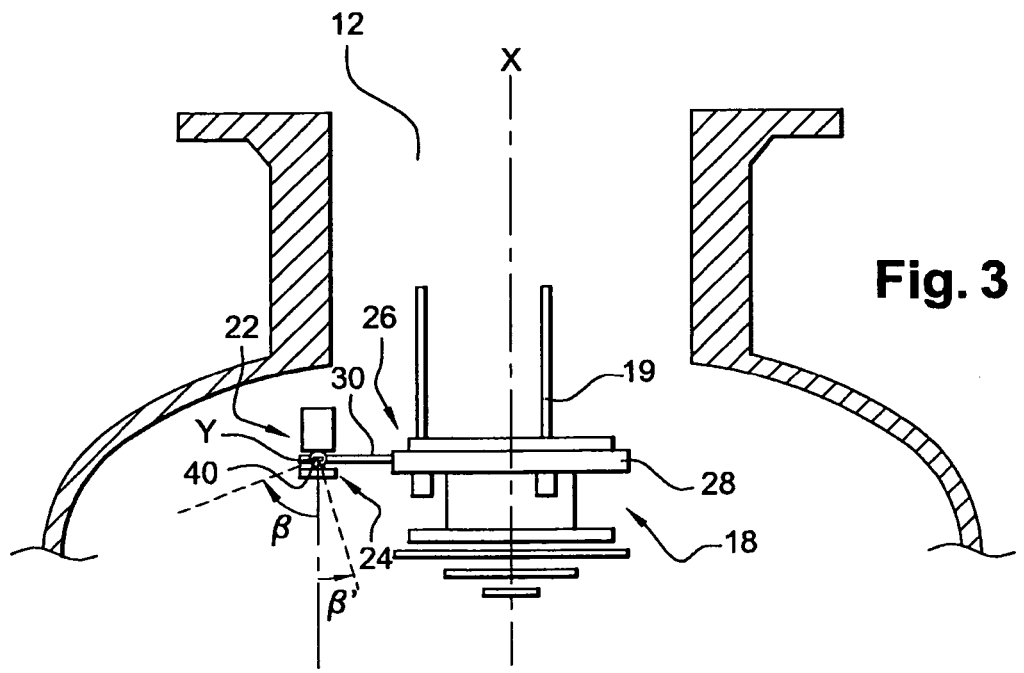
FIG. 3 is an enlarged view of the system of FIG. 1.

As can be seen in FIG. 3, the system 22 includes a transmitter 24 that is more precisely a radar transceiver. That radar is capable of taking measurements over distances of as long as 70 meters (m).

The radar is positioned above the filling surface 20, in such a manner as to transmit electromagnetic waves towards various points of said surface, e.g. the points A, B, C, and D, thereby making it possible to determine their heights inside the reactor.

Figure 4:
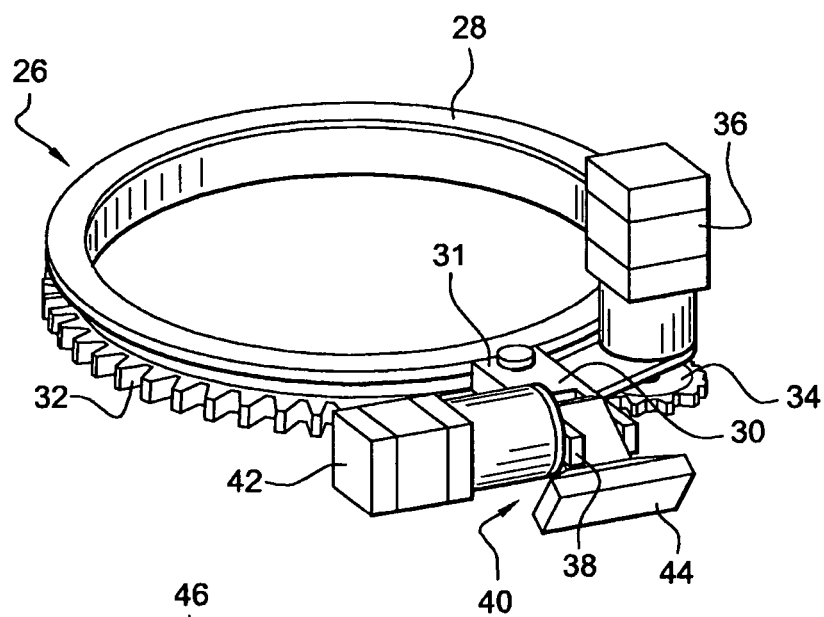
FIG. 4 is a perspective view of shift means and of pivot means for shifting and pivoting the system of FIG. 1.

The determination system 22 also includes means 26 for shifting the radar 24, which means are shown in FIG. 4. Said means 26 comprise a circular rail 28, mounted around the filler device 18, and a pivot arm 30 mounted perpendicularly to the central axis X of the reactor. The pivot arm 30 has an end 31 mounted to be shiftable in rotation on the circular rail 28. The rotary shifting is implemented by means of a rack 32 provided at the periphery of the rail 28, co-operating with a pinion 34 secured to the pivot arm 30, the pinion 34 being driven by an electric motor 36. The end 38 of the pivot arm 30 that is opposite from the end 31 is connected to the radar 24.

The determination system 22 also includes means 40 for pivoting the radar 24 about its own axis. These means comprise an electric motor 42 driving the radar, symbolized by the plate 44 in FIG. 4. The pivot axis Y of the radar is horizontal, as can be seen in FIG. 2, and allows the radar to pivot in a vertical plane $P_V$, and more precisely in a radial plane, i.e. a plane that contains the central axis X of the reactor.

Operation of the relief determination system 22 is described below.

Figure 2:
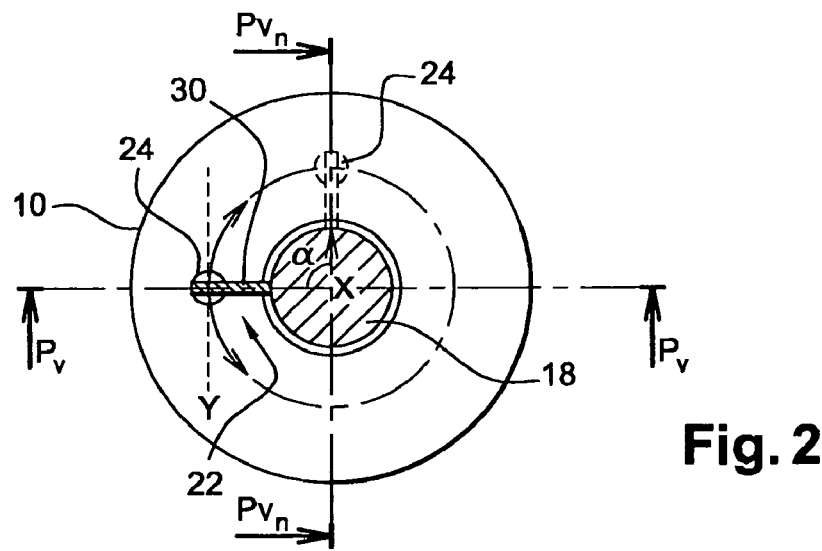
FIG. 2 is a section view on line II-II of FIG. 1.

While the reactor 10 is being filled, the radar 24 is in a first position, shown diagrammatically in continuous lines in FIG. 2. The radar 24 transmits signals towards various points A, B, C, D of the filling surface 20 that it can reach by means of the pivot means 40. Thus, in this first position, the radar 24 can pivot about the axis Y to take up various inclinations, such as inclinations of angles β (beta) and β' shown in FIG. 3. The angles β and β' can vary over the range 0° to 80°. Therefore, the radar 24 can take a series of measurements, in order to determine the heights of points of the filling surface located in the vertical plane $P_{V1}$.

Once the radar 24 has scanned the points of the filling surface in the plane $P_V$, the shift means 26 are triggered, in such a manner as to shift the radar 24 through a certain angle α (alpha) about the axis X. Thus, the transmitter 24 can be shifted in the horizontal plane $P_H$ that can be seen in FIG. 1, in such a manner as to take up a plurality of positions about the filler device 18, by causing the values of the angle α to vary. Each time the radar 24 changes position, it can take measurements in the corresponding vertical plane $P_{Vn}$, by means of it pivoting about the means 40.

As can be seen in FIG. 2, in which the radar 24 is in an $n^{th}$ position, shown in dashed lines, corresponding to an angle α of a value of 90°, the radar 24 can be shifted over long distances, so that it can take measurements that are not accessible from the first position, in particular because of the presence of the filler device 18 in the center of the reactor. In addition, from said $n^{th}$ position, the radar 24 can view relief on the filling surface from a viewing angle that is totally different from the viewing angle of the first position.

The means 26 make it possible to shift the radar 24 through an angle of 360° about the central axis X, so that, once the radar 24 has traveled a full circle about the axis, while taking up a plurality of positions about said axis, a topographical survey that is particularly accurate is obtained of the filling surface 20 of the reactor.

The measurements may be taken by the determination system continuously or periodically. They are transmitted in real time to a control station and they are processed in such a manner as to make it possible to obtain the topographical survey of the filling surface 20. By means of said topographical survey, it is possible, once the relief of the filling surface 20 has been determined, to modify the filling parameters in order to correct the relief and obtain a surface that is plane and horizontal.

Furthermore, it is possible to record a history of filling of the reactor that can be consulted subsequently if it is desired to verify how the reactor was filled.

The method of mounting the filler device 18 and the determination system 22 in the reactor 10 is described below.

Firstly, the filler device 18, as supported by the support members 19, is mounted in the reactor. Then, the determination system 22 is mounted on the device 18. Preferably, it is mounted removably thereon, by means of clips, so that it is easy to remove and to mount on another reactor.

In a slightly different mounting method, firstly the circular rail 28 is mounted on the filler device 18. Then, said filler device, as supported by the support members 19, is mounted on the reactor. Then the radar 24, as connected to the pivot arm 30, is mounted on the circular rail 28, preferably by fastening it removably with clips. In order to mount the arm 30 and the radar 24, it is advantageous to insert them into the filling opening 12 perpendicularly to their final position, i.e. so that the pivot arm 30 is parallel to the vertical axis, thereby reducing the amount of space necessary for mounting it when the filler device 18 takes up too much space in the filling opening 12. Then, once the radar 24 and the pivot arm 30 are inside the vessel of the reactor, it is possible to align them perpendicularly to the axis X, so that the arm 30 lies in the horizontal plane $P_H$, e.g. in the first position described above.

Figure 5:
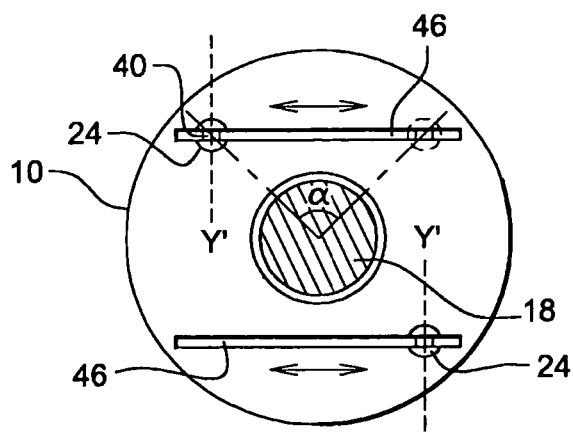
FIG. 5 is a view similar to the FIG. 2 view showing a second embodiment of a relief determination system of the invention.

Another embodiment of the system of the invention is shown in FIG. 5. Elements analogous to the elements shown in FIGS. 1 to 4 are designated by identical references. The shift means 26 comprise rectilinear means 46 aligned with two chords of the circular section of the reactor 10. The means 46 are made up of a guide rail that is stationary relative to the reactor and that co-operates with complementary guide means on the radar 24. As in the first embodiment, the determination system includes pivot means 40 for pivoting the radar about an axis Y'. Thus, in each of these positions, the radar 24 can be inclined in a vertical plane $P_{Vn}$ so as to scan the filling surface in said plane.

The method of operation of the system is similar to the method of operation of the first embodiment.

Finally, it should be noted that the invention is not limited to the above-described embodiments.

Among the advantages of the invention, it should be noted that it is possible to determine relief on the filling surface 20 without having to cause an operator to go inside the reactor, thereby sparing the operator the task of working in a dusty and chemical environment.

It should also be noted that it is particularly quick to mount the determination system in the reactor, while also procuring a system that delivers distance measurements that are particularly reliable.

Finally, through its simplicity, light weight, and compactness, the determination system can be fitted to various types of filler device, and it can be implemented in the most confined of spaces.

The invention claimed is:
1. A system for determining relief on a granule filling surface in a petrochemical reactor, a filling direction in which the reactor is filled defining a vertical direction, the reactor having a central vertical axis, the system including
   a transmitter configured to be positioned above the filling surface in such a manner as to transmit a signal to various points of said surface, shift means for shifting the transmitter relative to the central axis of the reactor through an angle that is greater than 60°, fastener means for fastening the system to a filler device for filling the reactor with granules, the fastener means being releasable.

2. A system according to claim 1, wherein the transmitter is a transceiver.

3. A system according to claim 2, wherein the transceiver is a radar transceiver.

4. A system according to claim 1, further including means for pivoting the transmitter about an own axis of the transmitter.

5. A system according to claim 1, wherein the shift means make it possible to shift the transmitter through an angle of 360° about the central axis of the reactor.

6. A system according to any claim 1, including electric drive means for driving the means for shifting and/or the means for pivoting the transmitter.

7. A system according to claim 1, wherein the shift means comprise rectilinear shift means.

8. A system according to claim 1, wherein the shift means comprise means for shifting the transmitter in rotation about the central axis of the reactor.

9. A system according to claim 8, including a pivot arm having one end connected to the transmitter and having its opposite end serving to be connected to a granule filler device.

* * * * *